(12) United States Patent
Hanlon et al.

(10) Patent No.: US 9,722,891 B2
(45) Date of Patent: Aug. 1, 2017

(54) METHOD AND SYSTEM FOR GENERATING AND PROVIDING DATA ALERTS

(71) Applicant: GMarkets Inc., Toronto (CA)

(72) Inventors: Robin Julie Hanlon, Toronto (CA); Salvatore Speranini, Newmarket (CA)

(73) Assignee: 10029629 CANADA INC., Toronto (CA)

(*) Notice: Subject to any disclaimer, the term of this patent is extended or adjusted under 35 U.S.C. 154(b) by 333 days.

(21) Appl. No.: 13/939,728

(22) Filed: Jul. 11, 2013

(65) Prior Publication Data

US 2013/0304910 A1   Nov. 14, 2013

Related U.S. Application Data

(63) Continuation of application No. PCT/CA2012/000053, filed on Jan. 17, 2012.

(Continued)

(51) Int. Cl.
*H04L 12/26* (2006.01)
*G06Q 10/06* (2012.01)
(Continued)

(52) U.S. Cl.
CPC ........ *H04L 43/00* (2013.01); *G06F 17/30867* (2013.01); *G06Q 10/06* (2013.01);
(Continued)

(58) Field of Classification Search
CPC ........ H04L 41/00; H04L 43/00; H04L 51/00; H04L 61/00; H04L 65/00; H04L 67/00; H04L 69/00; H04L 12/1895; H04L 67/22; H04L 67/26; H04L 12/5855; G06F 17/30867; G06Q 10/06; G06Q 10/10; G06Q 30/02
See application file for complete search history.

(56) References Cited

U.S. PATENT DOCUMENTS 5,454,104 A   9/1995  Steidlmayer et al.
6,349,291 B1  2/2002  Varma
(Continued)

FOREIGN PATENT DOCUMENTS

| CA | 2663489 | 10/2009 |
|---|---|---|
| WO | 02/102097 A1 | 12/2002 |
| WO | 2012100327 A1 | 8/2012 |

OTHER PUBLICATIONS

Charles M. Kozierok, The TCP/IP guide: A comprehensive, illustrated Internet protocols reference, Oct. 4, 2005, No Starch Press, 1648 pages.*

(Continued)

*Primary Examiner* — Wing F Chan
*Assistant Examiner* — Billy H Ng
(74) *Attorney, Agent, or Firm* — Bereskin & Parr LLP/S.E.N.C.R.L., s.r.l.

(57) ABSTRACT

Methods and systems for providing alerts to users of data aggregation systems. Alerts are generated when data usage patterns relating to data items of interest exceed a threshold level. Alerts can be provided in real-time or at intervals, via alerts or other notification methods. Alerts can be based on individual data items or correlations of data items, where the data items can be provided by local or external sources.

20 Claims, 9 Drawing Sheets

Related U.S. Application Data

(60) Provisional application No. 61/436,683, filed on Jan. 27, 2011.

(51) Int. Cl.
| | | |
|---|---|---|
| *G06Q 10/10* | (2012.01) | |
| *H04L 12/18* | (2006.01) | |
| *H04L 29/08* | (2006.01) | |
| *G06F 17/30* | (2006.01) | |
| *H04L 12/58* | (2006.01) | |
| *G06Q 30/02* | (2012.01) | |

(52) U.S. Cl.
CPC ......... *G06Q 10/10* (2013.01); *H04L 12/1895* (2013.01); *H04L 67/22* (2013.01); *H04L 67/26* (2013.01); *G06Q 30/02* (2013.01); *H04L 12/5855* (2013.01)

(56) References Cited

U.S. PATENT DOCUMENTS

| | | | |
|---|---|---|---|
| 7,275,046 | B1 | 9/2007 | Tritt et al. |
| 7,536,417 | B2 | 5/2009 | Walsh et al. |
| 7,685,192 | B1* | 3/2010 | Scofield et al. ............. 707/709 |
| 2002/0004774 | A1 | 1/2002 | Defarlo |
| 2002/0082967 | A1 | 6/2002 | Kaminsky et al. |
| 2003/0110249 | A1* | 6/2003 | Buus et al. .................. 709/224 |
| 2003/0126560 | A1* | 7/2003 | Kurapati et al. ............. 715/514 |
| 2004/0164961 | A1 | 8/2004 | Bal et al. |
| 2005/0125322 | A1 | 6/2005 | Lacomb et al. |
| 2005/0203825 | A1 | 9/2005 | Angle et al. |
| 2008/0244017 | A1* | 10/2008 | Gershinsky ......... H04L 63/0227 709/206 |
| 2009/0176511 | A1* | 7/2009 | Morrison ................. 455/456.3 |
| 2009/0241031 | A1* | 9/2009 | Gamaley ................ G06Q 10/10 715/736 |
| 2010/0023587 | A1* | 1/2010 | Fletcher ............. H04L 12/1859 709/206 |
| 2010/0100537 | A1* | 4/2010 | Druzgalski et al. .......... 707/713 |
| 2011/0246401 | A1* | 10/2011 | Arora ................ G06F 17/30572 706/12 |
| 2012/0059825 | A1* | 3/2012 | Fishman ........... G06F 17/30053 707/737 |
| 2012/0117017 | A1* | 5/2012 | Phillips ............ H04N 21/44204 706/50 |
| 2012/0294158 | A1* | 11/2012 | Boot .................. H04L 63/1416 370/252 |

OTHER PUBLICATIONS

International Search Report and Written Opinion dated Mar. 20, 2012, International Application No. PCT/CA2012/000053.
Office Action in relation to corresponding Canadian Application No. 2814933 dated Aug. 6, 2015.
Supplementary European Search Report in relation to corresponding EP Application No. 12739506, dated Feb. 16, 2015.
HTTP Status Codes and Reason Phrases. http://techbus.safaribookonline.com/print?xmlid=9781593270476%2Fid3372528 accessed on Jul. 27, 2015.

* cited by examiner

METHOD AND SYSTEM FOR GENERATING AND PROVIDING DATA ALERTS

FIELD

The described embodiments relate to methods and systems for providing notifications or alerts and in particular to methods and systems for generating and providing said alerts to a plurality of remote terminals.

BACKGROUND

In the financial services industry, buyers and sellers (e.g., traders) of financial instruments typically monitor and use information from one or more information sources when forming decisions to buy or sell the financial instruments. These information sources may provide data related to securities, such as equities, futures, options, etc. A user interface on a computing device may be provided in association with the information sources to facilitate selecting and viewing data of interest. Data may be provided in real-time, as up-to-date data can be important to allow the trader to quickly identify unusual market activity (which may signal opportunities for profit) and act accordingly.

In some cases, traders or financial analysts may track the price of a particular financial instrument to generate near-term or long-term (or both) price predictions based on certain indicators in the price data provided by their information sources. The indicators may be trading volume, price trends and the like. In general, such predictions tend to be reactive, and based on historical data. As a result, by the time a prediction can be made with confidence, the opportunity to profit from successfully exploiting the price predictions may be lost.

SUMMARY

In one broad aspect, there is provided a method of generating an alert message. The method can comprise receiving a plurality of discrete data elements, the plurality of discrete data elements grouped into a plurality of data feeds; parsing the plurality of data feeds to identify each of the plurality of discrete data elements; assigning a plurality of identifiers, each of the plurality of identifiers assigned to one of the plurality of discrete data elements; receiving a plurality of activation lists for a plurality of remote terminals, each activation list comprising a subset of the plurality of identifiers; for each activation list, generating and activating a display interface at the corresponding remote terminal, the display interface comprising a subset of the plurality of discrete data elements corresponding to the subset of the plurality of identifiers in the activation list; updating a plurality of viewership indicators corresponding to each of the plurality of discrete data elements, each update based on a total number of the plurality of activation lists in which each of the plurality of discrete data elements appears; and generating the alert message when at least one of the plurality of viewership indicators exceeds an activity threshold level.

The activity threshold level may be a specific threshold level corresponding to one of the plurality of viewership indicators, and the method may further comprise generating the specific threshold level based on the one of the plurality of viewership indicators. The activity threshold level may be a composite threshold level corresponding to a subset of the plurality of viewership indicators, and the method may further comprise generating the specific threshold level based on the subset of the plurality of viewership indicators.

The method may further comprise receiving a plurality of deactivation requests, each deactivation request comprising a second subset of the plurality of identifiers; for each deactivation request, deactivating the display interface at the corresponding emote terminal; and updating the plurality of viewership indicators corresponding to each of the plurality of discrete data elements, each update based on a second total number of the plurality of deactivation requests in which each of the plurality of discrete data elements appears.

In another broad aspect, there is provided a system for generating an alert message. The system can comprise a memory; at least one communication interface; and a processor. The processor can be configured to: receive a plurality of discrete data elements, the plurality of discrete data elements grouped into a plurality of data feeds; parse the plurality of data feeds to identify each of the plurality of discrete data elements; assign a plurality of identifiers, each of the plurality of identifiers assigned to one of the plurality of discrete data elements; receive a plurality of activation lists for a plurality of remote terminals, each activation list comprising a subset of the plurality of identifiers; for each activation list, generate and activate a display interface at the corresponding remote terminal, the display interface comprising a subset of the plurality of discrete data elements corresponding to the subset of the plurality of identifiers in the activation list; update a plurality of viewership indicators corresponding to each of the plurality of discrete data elements, each update based on a total number of the plurality of activation lists in which each of the plurality of discrete data elements appears; and generate an alert message when at least one of the plurality of viewership indicators exceeds an activity threshold level.

The activity threshold level may be a specific threshold level corresponding to one of the plurality of viewership indicators, and the process may be further configured to generate the specific threshold level based on the one of the plurality of viewership indicators.

The activity threshold level may be a composite threshold level corresponding to a subset of the plurality of viewership indicators, and the process may be further configured to generate the specific threshold level based on the subset of the plurality of viewership indicators.

The processor may be further configured to: receive a plurality of deactivation requests, each deactivation request comprising a second subset of the plurality of identifiers; for each deactivation request, deactivate the display interface at the corresponding remote terminal; and update the plurality of viewership indicators corresponding to each of the plurality of discrete data elements, each update based on a second total number of the plurality of deactivation requests in which each of the plurality of discrete data elements appears.

At least one activation request may comprise a group identifier for identifying a second subset of the plurality of identifiers according to an associated criterion. The associated criterion may be a type associated with the discrete data element, or a geographical region associated with the discrete data element.

Each of the plurality of activation requests may correspond to one of the plurality of remote terminals.

Each of the plurality of remote terminals may be associated with a unique user identifier.

The plurality of discrete data elements may be received from a plurality of external sources.

In another broad aspect, there is provided a non-transitory computer readable medium storing instructions executable by a processor, the instructions for causing the processor to: receive a plurality of discrete data elements, the plurality of discrete data elements grouped into a plurality of data feeds; parse the plurality of data feeds to identify each of the plurality of discrete data elements; assign a plurality of identifiers, each of the plurality of identifiers assigned to one of the plurality of discrete data elements; receive a plurality of activation lists for a plurality of remote terminals, each activation list comprising a subset of the plurality of identifiers; for each activation list, generate and activate a display interface at the corresponding remote terminal, the display interface comprising a subset of the plurality of discrete data elements corresponding to the subset of the plurality of identifiers in the activation list; update a plurality of viewership indicators corresponding to each of the plurality of discrete data elements, each update based on a total number of the plurality of activation lists in which each of the plurality of discrete data elements appears; and generate an alert message when at least one of the plurality of viewership indicators exceeds an activity threshold level.

BRIEF DESCRIPTION OF THE DRAWINGS

A preferred embodiment of the present invention will now be described in detail with reference to the drawings, in which.

Figure 1A:
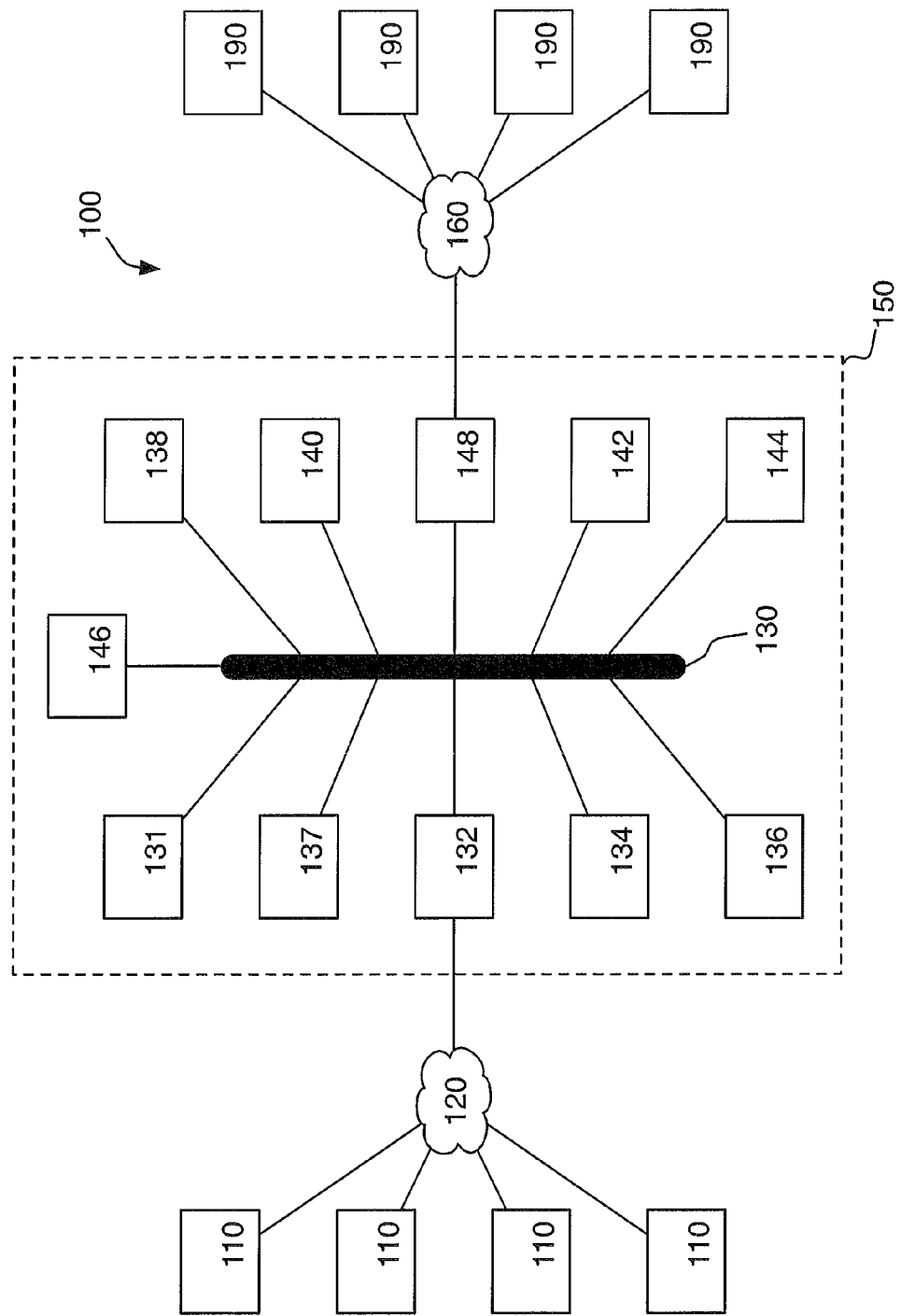
FIG. 1A is a schematic block diagram of an example alert generation and distribution system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EXEMPLARY
EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), and at least one communication interface. For example and without limitation, the programmable computers may be a server, network appliance, set-top box, embedded device, computer expansion module, personal computer, laptop, personal data assistant, or mobile device. Program code is applied to input data to perform the functions described herein and generate output information. The output information is applied to one or more output devices, in known fashion. In some embodiments, the communication interface may be a network communication interface. In embodiments where elements of the invention are combined, the communication interface may be a software communication interface, such as those for inter-process communication (IPC). In still other embodiments, there may be a combination of communication interfaces.

Each program is preferably implemented in a high level procedural or object oriented programming and/or scripting language to communicate with a computer system. However, the programs can be implemented in assembly or machine language, if desired. In any case, the language may be a compiled or interpreted language.

The system, processes and methods of the described embodiments are capable of being distributed in a computer program product comprising a non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Reference is first made to FIG. 1A, in which there is shown an example alert generation and distribution system 100. Alert generation and distribution system 100 comprises data sources 110, alert generation system 150, remote terminals 190 and communication networks 120 and 160.

Data sources 110 can be sources of real-time, historical or periodically updated data or data feeds. Data feeds may comprise financial data, such as data from securities exchanges, dealers, inter-dealer brokers (IDBs), automated trading systems (ATSes), pricing services (e.g., CDS Intraday) and the like.

Examples of data sources 110 include: a listing marketplace, such as an exchange or alternative trading system; an agency or principal marketplace, such as an investment dealer or bank; a brokered marketplace, such as an inter-dealer broker; a regulator, such as a central bank that sets and publishes certain rates such as a prime or discount rate; a bank setting prime and other lending rates; an analyst, firm or statistical agency forecasting or analyzing data, prices or rates; an evaluation company that provides mark to market or other evaluation services; a clearing corporation or securities depository; a news wire; a commentary publisher; and/or a search engine.

As noted, data may also be news information, such as data from news wires, press services and the like. Other data sources 110, both formal and informal, may be used. For example, some data sources 110 may be web sites or search engines on the Internet. Each data source 110 may provide a plurality of discrete data elements, such as financial data items, pages, news headlines, news stories, composite displays, raw text, structured text or other data that may be of relevance.

A page can include a display of fields and columns displaying single or multiple items and other data as it pertains to an asset class, asset or marketplace.

A news headline can include text that may precede a story relevant to an asset class, asset, marketplace, etc. Likewise, a news story can identify text that is relevant to an asset class, asset, marketplace, etc.

A composite display can include a display of fields and columns for displaying single or multiple items and other data relevant to an asset class, asset, marketplace, etc.

Other data may include, but is not limited to: bank rates, fixing rates, exchange rates, yield curves, economic calendars, statistics, central bank announcements, and the like.

In financial information and other applications, data source 110 may provide discrete data elements, such as price data and other data, relating to asset classes, particular assets, sources and marketplaces (e.g., securities exchanges) as described in greater detail herein.

Discrete data elements (which may be referred to as data items) can be identified in multiple ways. For example, some discrete data elements may be identified by identifiers, tags or metadata fields associated with each item the data source feeds.

Communication networks 120 and 160 can be public or private networks suitable for wired or wireless data communication. In some cases, communication networks 120 and 160 may belong to the same network, such as the Internet, a private network or a virtual private network (VPN). In other cases, portions of one or both communication networks 120 and 160 may be dedicated communication links.

Alert generation system 150 can comprise a plurality of software or hardware modules, including an alerts generation module 131, feed module 132, a security module 134, a user module 136, a permissioning module 137, an entitlements module 138, a data verification module 140, a publishing module 142, a web module 144 and a history module 146. Each of the plurality of modules comprising alert generation system 150 can be operated on one or more computing devices, such as a server computer. In some cases, one or more modules may be combined or merged, or may be operated on a single computing device. Each of the plurality of modules may also be interfaced with a database (not shown), such as a MySQL database, which may be provided by a separate computing device or by the same computing device that provides the respective module.

Each of the plurality of modules may be connected for data communication with each other via a data network 130, which may be a local area network, inter-process communication (IPC) or some combination thereof.

Alert generation system 150 may also comprise one or more network firewalls 148 for securing network borders or specific computing devices.

Alerts generation module 131 may be provided to generate alerts, as described herein.

Feed module 132, which may comprise one or more separate feed handlers, can receive data feeds from each of data sources 110. In some cases, data source 110 provides a real-time feed, in which case feed module 132 can be configured to process the received data feeds in real-time. In other cases, data source 110 may be updated periodically, for example every 15 minutes, in which case feed module 132 can be configured to process the received data feeds as the data is received or according to some other processing schedule.

In some cases, data source 110 may format data or data feeds it transmits according to a predetermined format, which may be machine-readable, for example by using extensible markup language (XML). However, each data source 110 may employ a distinct symbology. Accordingly, data verification module 140 can be adapted to specifically process and format data or data feeds received from each data source 110 using their respective symbologies, to identify discrete data elements within the particular symbology. For example, verification module 140 can be configured to process a data feed from a particular data source 110 by providing an XML Schema used by the data source 110.

In some cases, data source 110 may provide raw data that lacks machine-readable formatting. In such cases, verification module 140 may be configured to search for particular keywords, symbols or metadata within the raw data to identify or extract discrete data elements. Further, verification module 140 may be configured to associate metadata identifiers with the identified discrete data elements.

For example, if a data source provides news data, a news story may be subdivided into HEADLINE, BYLINE, HEADER, SUMMARY, BODY sections. Accordingly, verification module 140 can be adapted to identify the respective sections and, where desired, to further search for keywords or symbols within the sections.

In some cases, the functionality of feed module 132 and verification module 140 may be merged.

Security module 134 can be configured to maintain a database of securities, along with all associated fields. Data regarding the securities may be obtained from multiple sources, and stored by security module 134. In some cases, each source may have its own security module 134. In general, security module 134 can be used when performing field mapping, naming, calculations, historical retrieval, logic creation, etc.

User module 136 can be configured to track the number of users actively viewing each discrete data element identified by alert generation system 150. Users may be identified by a unique user identifier. Accordingly, when a user at a remote terminal 190 requests information regarding a discrete data element, for example by submitting an interrogation request or alert request as described herein, when the discrete data element (or the information relating to the discrete data element) is displayed at the remote terminal, user module 136 can update a a viewership indicator to indicate an increase in viewership of that discrete data element. Conversely, when the user discontinues viewing the information, user module 136 can update the viewership indicator to indicate a decrease in viewership. In some cases, user module 136 can update the viewership indicator to indicate that the discrete data elements is in an intermediate state, wherein the user has requested the discrete data element, but it is not actively displayed at the user terminal.

Permissioning module 137 can be configured to provide users access to an environment or content by source, field, packaging, or other criteria. Permissioning module 137 may co-operate with entitlements module 138 to provide access. In some cases, permissioning module 137 may be merged with entitlements module 138.

Entitlements module 138 may be provided to track use of alert generation system 150 by each user at a remote terminal 190. Users may be provided with accounts by alert generation system 150. Accordingly, entitlements module 138 may track usage associated with each account and generate invoices, usage statements and the like. Entitlements module 138 may also generate reports for accounting purposes, such as accounts receivable, accounts payable and audit reports. In some cases, entitlements module 138 may be configured to monitor usage on a metered basis. For example, entitlements module 138 may register individual requests (e.g., quote requests) by specific users and apply a per-request price.

Publishing module 142 may be configured to push data and alerts to remote terminals 190. Publishing module 142 may operate in cooperation with web module 144, which can provide a web server interface for users at remote terminals 190 to interact with alert generation system 150.

History module 146 can be provided to retain a record or "snapshots" of data currently provided by alert generation system 150.

Figure 1B:
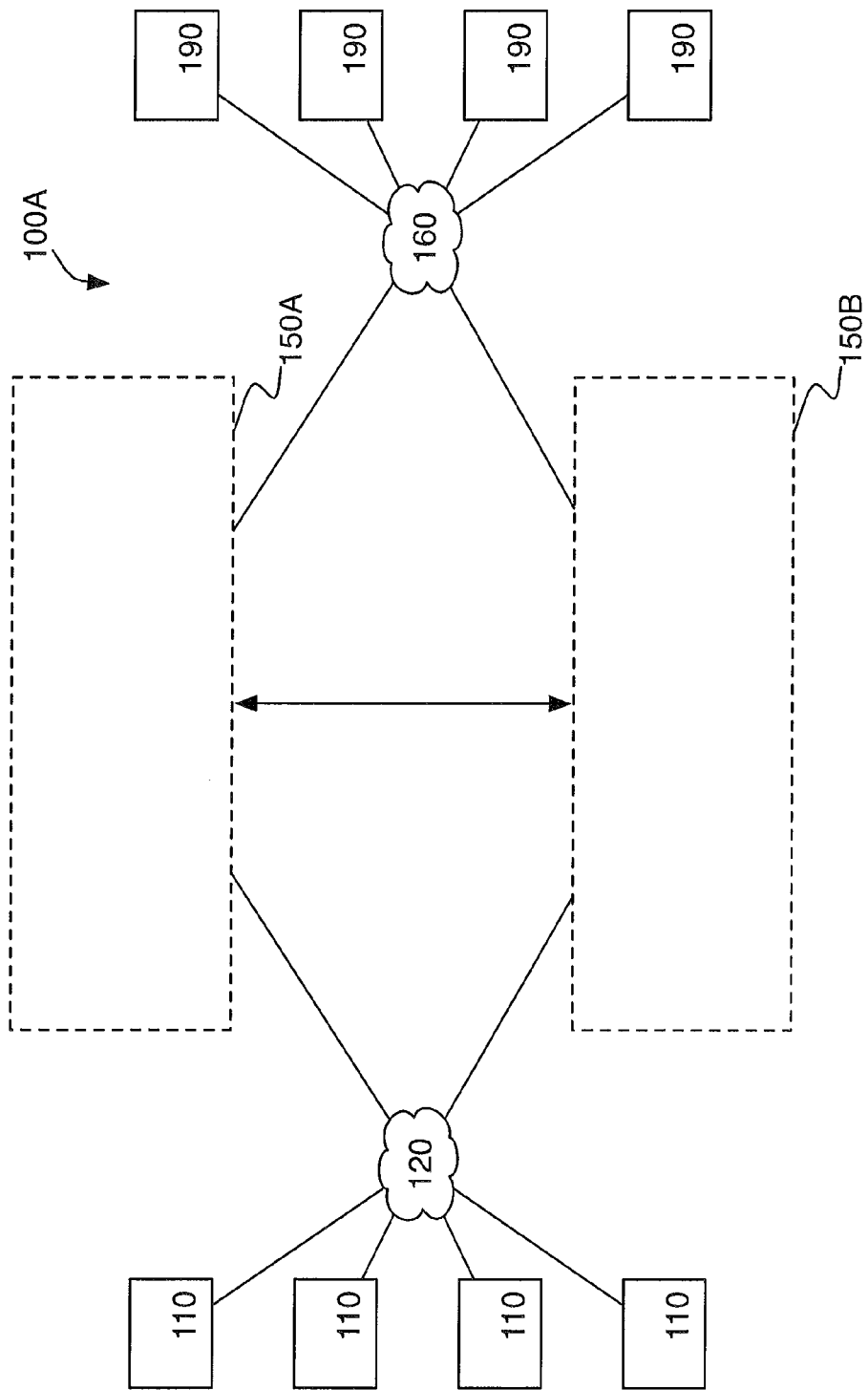
FIG. 1B is a schematic block diagram of another example alert generation and distribution system.

In some embodiments, more than one alert generation system 150 may be provided, to ensure availability of the system through redundancy, to manage demand, and the like. Referring now to FIG. 1B, there is shown an example alert generation and distribution system 100A, in which there is provided a primary alert generation system 150A and a secondary alert generation system 150B. Alert generation systems 150A and 150B are interconnected via a data communication link. Each of the alert generation systems 150A and 150B can be connected to data communication networks 120 and 160, and each system may generate and provide alerts in accordance with an overall system configuration. For example, primary alert generation system 150A may generate all alerts while it is operative, whereas secondary alert generation system 150B may generate alerts when primary alert generation system 150A is inoperative. In another cases, both alert generation systems 150A and 150B may share their respective loads and may communicate with each other to distribute alert generation tasks according to a load-balancing algorithm.

Remote terminals 190 can be computing devices suitable for communicating and receiving data from alert generation system 150. Suitable computing devices may include desktop and laptop computers, smartphones, personal digital assistants, tablet computers, mobile devices, server computers and the like.

In some cases, one or more remote terminals 190 may further comprise a sub-network of computing devices, each of which may be configured to act as an independent remote terminal 190. Remote terminals 190 may be provided to, or operated by, users of the alert generation and distribution system, such as securities vendors, securities exchanges, evaluation services, dealers, IDBs, ATSes, news media, securities regulators, investment advisors, private investors, institutional investors, brokers, and others.

In cases where a remote terminal 190 comprises a sub-network of computing devices, an administrative device may be provided or chosen from among the sub-network of computing devices.

Figure 2:
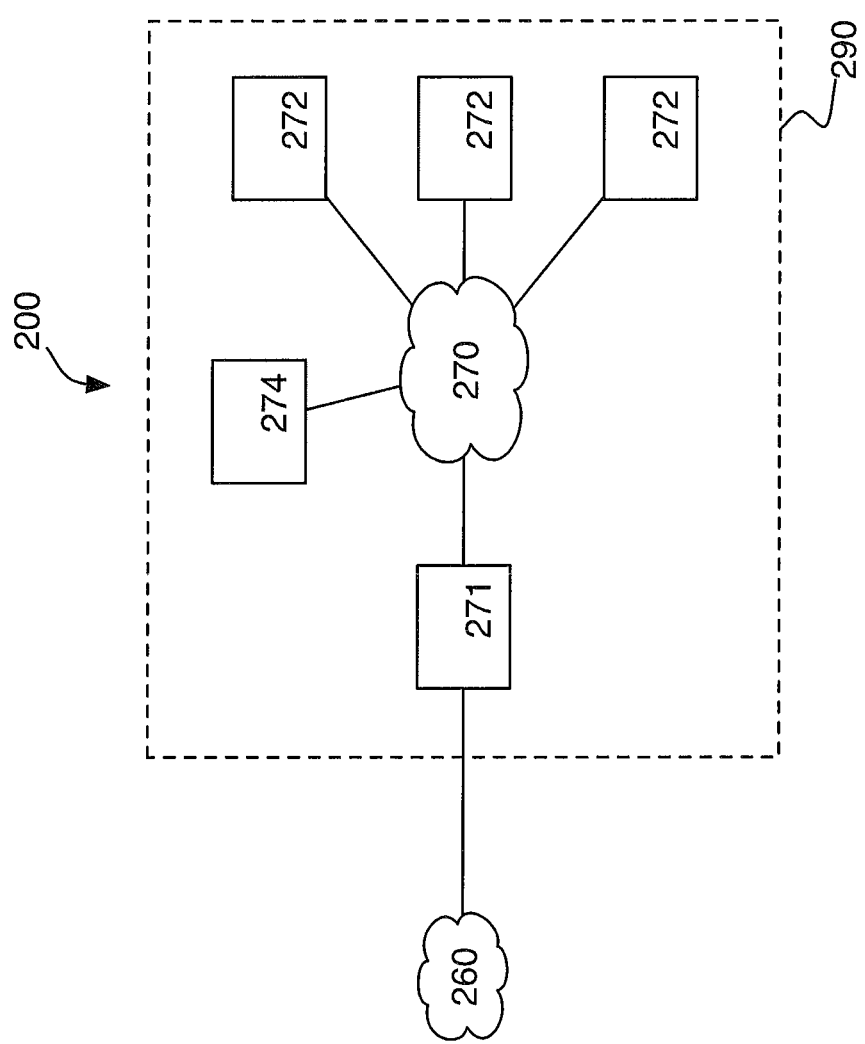
FIG. 2 is a schematic block diagram of an example remote terminal comprising a sub-network.

Referring now to FIG. 2, there is shown an example remote terminal 290 comprising a sub-network of computing devices 272 connected to each other for data communication via a local area network 270. An administrative device 274 is also connected to the local area network 270 to manage access to the alert generation system by the computing devices 272. Administrative device 274 may also be configured to interface with alert generation system 150 (connected via communication network 260) and locally distribute alerts provided by alert generation system 150 (e.g., to generate interrogation requests).

In some cases, data sources 110 may be provided with, or configured to act as, remote terminals 190. Accordingly, providers of data sources 110 may be offered similar services as end users. In some cases, the remote terminals 190 provided to data sources 110 may be direct data interfaces, for example omitting a user display interface and allowing data sources 110 to directly interface with alert generation system 150.

In some cases, the alert generation system may be interfaced with an associated system, which may be located on another data distribution network, such as a newswire service backbone.

Figure 3:
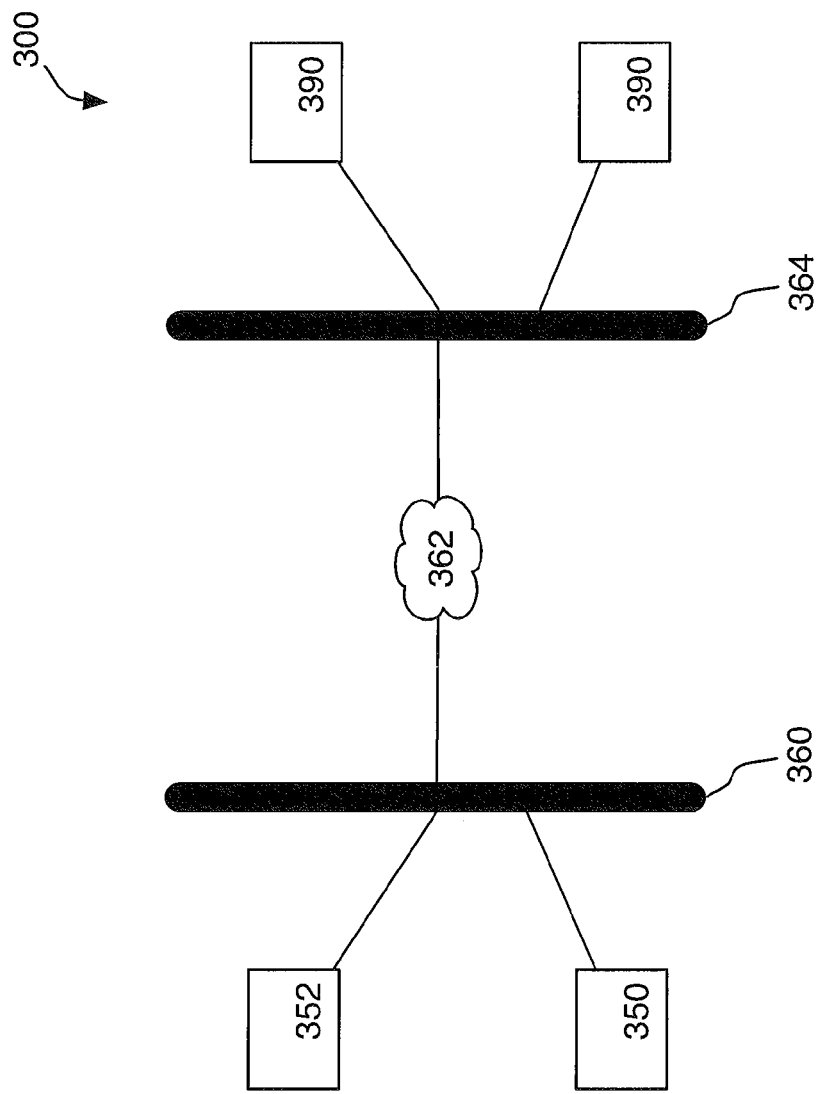
FIG. 3 is a schematic block diagram of yet another example alert generation and distribution system.

Referring now to FIG. 3, there is shown an example schematic diagram of an alert generation system connected to a data distribution network. Alert generation system 350 can be connected to a data backbone network 360. One or more third-party data services or associated systems 352 may also be connected to the data backbone network 360. Accordingly, data provided by alert generation system 350 can be provided to remote terminals 390 via the data backbone network 360. In some cases, the provided data may traverse an intermediate network 362 and a second backbone network 364. Intermediate network 362 may be a data communication network or intermediate network 362 may be another data service, such as an IDB, in which configuration, data provided by alert generation system 350 may incorporated into data provided by the IDB. In some other cases, intermediate network 362 and second backbone network 364 may be omitted.

In some cases, alert generation system 350 may be integrated with third-party services 352. In still other cases, services provided by alert generation system 350 may be integrated with third-party services 352.

In some cases, third-party services 352 may be provided with, or configured to act as, remote terminals 190. Accordingly, providers of third-party services 352 may be offered similar services as end users. In some cases, the remote terminals 190 provided to third-party services 352 may be direct data interfaces, for example omitting a user display interface and allowing third-party services 352 to directly interface with alert generation system 150 (e.g., to generate interrogation requests).

Alert generation system 150 (and analogous systems 150A, 150B, 250 and 350) can be configured to provide data from a variety of sources in a convenient user interface to each computing device comprising remote terminals 190. For example, alert generation system 150 can provide financial data, such as market rates, financial news and the like. In an example embodiment, alert generation system 150 can provide a thin-client user interface for display and manipulation at remote terminals 190. The user interface can use a "windowing" model, in which different sources of information are displayed in distinct windows. Each window can display data regarding a collection of discrete data elements or be dedicated to one or relatively few discrete data elements, which can be custom-selected by the user of the respective remote terminal.

Alert generation system 150 can be configured to maintain a "session" or "environment" in the system for one or more users. When a user logs in to the system at a remote terminal 190, the system 150 can instruct the remote terminal 190 to restore the windows and views that the user has previously configured. New windows and queries can be added by the user using an "interrogation request", described in greater detail with reference to FIG. 4. In general, each window and view can be registered with the alert generation system 150, and the system not only keeps track of the window itself, but also each of the discrete elements that are displayed in the window.

Because the server can generate each display window, and because the system can be aware of each discrete element in each window, it can determine precisely which discrete elements are being displayed to each user at a given time (e.g., based on viewership indicators). Accordingly, when a plurality of users are logged in to the system, the system can determine aggregate data regarding the discrete elements that are displayed to all users, such as the number of users concurrently viewing or accessing a particular discrete element, which may provide an indication of what data is of greatest interest at that point in time.

Alert generation system 150, and alerts generation module 131 in particular, can be configured to generate "alerts" when users begin to show an unusual interest in a particular discrete data element. In order to determine a threshold level for generating alerts, alert generation system 150 can maintain one or more "baselines" or activity threshold levels that indicate a rolling average or mean interest level or absolute interest level in particular data elements.

For ease of exposition, alert generation system 150 is described herein as generating alerts. However, it should be understood that alerts generation module 131 of the alert generation system 150 may perform some or all of the alert generation process. In some cases, alerts generation module 131 may also co-operate with or coordinate the function of other modules to generate alerts.

Alert generation system 150 may generate an alert when a fluctuation in viewer interest exceeds a predetermined threshold level or some other threshold level. For example, the threshold level may be a dynamic threshold determined by some predefined criteria. Activity threshold level and alert configuration are described in further detail with reference to FIG. 6. For example, when a plurality of remote terminals 190 connect to the alert generation system 150 at the start of a business day, many users may begin monitoring the stock price of ABC, a large publicly traded company. In contrast, relatively few users will monitor XYZ, a small company. The system may generate an activity threshold level or "baseline" for this state, in which it is identified that many users are monitoring ABC and few are monitoring XYZ. Subsequently, if a relatively large number of users suddenly begin monitoring XYZ, and the variation ("demand delta") is above a predetermined threshold, this may cause an alert to be generated, which can be sent to other users, based on their needs.

Accordingly, alert generation system 150 and alerts generation module 131 may be configured to constantly monitor viewership of every discrete element of data that is currently displayed to logged-in users. More particularly, alert generation system 150 and alerts generation module 131 can be configured to detect fluctuations in the display of particular data elements and can be configured to generate user alerts based on these fluctuations. In particular, alert generation system 150 and alerts generation module 131 may be configured to identify fluctuations in correlated data. For example, an alert may be generated when a first discrete data element fluctuates relative to a second discrete data element. Alerts may be disseminated or displayed statistically or graphically.

Demand deltas may be determined based on a number of factors, such as a geographic region for which the delta calculation is to be performed (e.g. North America), a total number of users (in aggregate, or in a geographic region), a number of active users, a number of active users within a certain time period (e.g., between 9:00 am and 5:00 pm for a specific time zone), demand data for a predetermined number of previous days, or other demand deltas.

Accordingly, alerts can be generated to indicate that a user population of interest is scrutinizing certain discrete data elements above or below a threshold level.

Alerts relating to participants, asset class, asset type, marketplace, source or geographic region may be generated in real-time, at periodic intervals, delayed or historically for data that may be aggregated by a source, marketplace, data vendor, exchange or other data aggregator.

Figure 4:
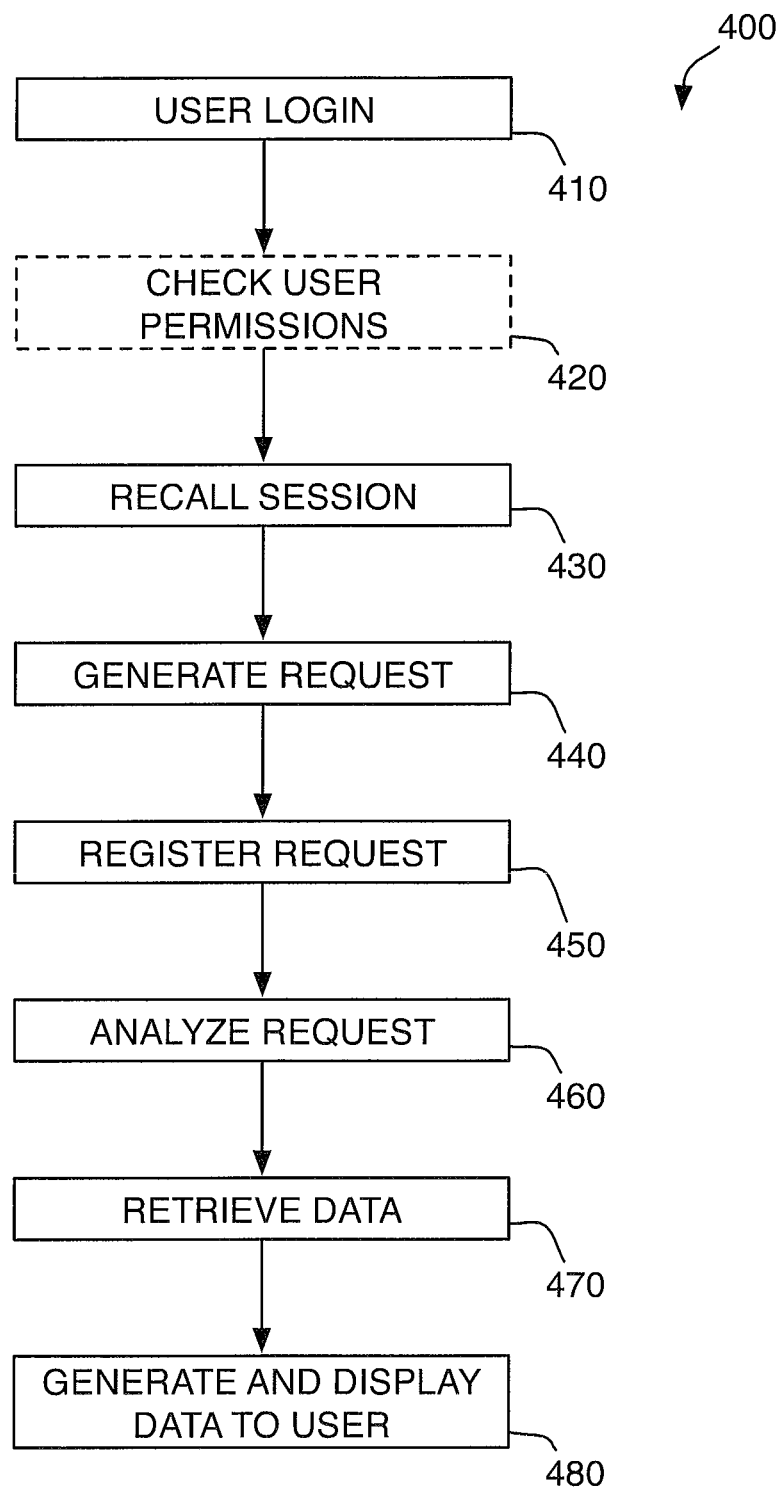
FIG. 4 is an example process flow diagram for generating an interrogation request at a remote terminal.

Referring now to FIG. 4, there is shown an example process flow 400 for generating an interrogation request at a remote terminal, such as remote terminal 190.

At 410, a user can login to a user account provided on alert generation system 150 at a remote terminal 190. Optionally, at 420, system 150 can verify that the user account has permission to access the system. Further, entitlements module 138 may verify at 420 the specific data sources and services that the user account is configured to access.

If the user account has previously used system 150, user module 136 can recall the user account's last session and reactivate the previous display windows at the remote terminal 190. If the user account has not previously used system 150, or if the user requests a system reset, user module 136 may generate a blank display window or a default set of display windows for later configuration by the user.

At 440, remote terminal 190 generates an interrogation request associated with the current session. A user interface may be provided for configuring the interrogation request, in which the interrogation request may be configured by selecting one or more criteria, including type criteria, change criteria and correlation criteria.

Type criteria may be criteria indicative of the type of the data that forms the basis of the interrogation request, such as an asset class, asset type, item type (e.g., a stock exchange symbol, an economic statistic, news stories, etc.), page, particular item, source type, marketplace, geographical or political region associated with the data, participant type and publisher type (e.g., IDB).

The participant type can identify end users of information such as inter-dealer brokers, banks, dealers, buy side institutions, corporations, retail investors, regulators or data sources.

The asset class can identify a collection of like assets that exhibit similar characteristics. For example, equities, fixed-income, cash equivalents, derivatives, etc.

The asset type can be a specific type of asset. For example, spot, cross, forward, bond, etc.

The source type can identify an originator of data. For example, a company, stock exchange, news wire, etc.

The marketplace can identify an exchange or other venue where assets are available for purchase and sale.

The geographic region can identify a specific location, country, continent, time zone or other geographic region. Likewise, the political region can identify a specific nation, state, county, city and the like.

The item type can identify an item of data with associated fields or metadata identifiers. Examples of associated fields include: source name, item name, item acronym or symbol or numeric identification code (e.g., CUSIP, ISIN, etc.), bid/ask price, bid/ask yield, bid/ask size, trade price/yield/size, coupon, maturity, and the like.

Change criteria may be configured by selecting a change threshold for one or more of the data types. For example, an interrogation request can be configured to identify all data items for a particular geographical region that exhibit an increase in viewership popularity in real-time, over a predetermined period, or relative to a previous period. Increases and decreases in popularity may be determined with relative measures, such as percentage change, or may be defined in terms of absolute numbers, such as a trading volume of a particular security.

In some cases, data may be more useful to a user when compared to a predetermined reference. Accordingly, correlation criteria may be configured by selecting historical data for a selected type criteria and comparing or correlating current data with the historical data. For example, a change in economic statistics for a current period may be compared or correlated with economic statistics over a five year period. In another example, a change in a trading level of a particular security may be compared or correlated with changes in viewership (e.g., by other users) of the trading level, volume or some other statistic. In yet another example, a change in a security's trading price may be compared or correlated with the trading price of the security (or other securities) over a two month period.

Accordingly, users can configure highly specific interrogation requests to identify the state of a market by selecting one or more of the type criteria, change criteria and correlation criteria.

In one example, a user may configure an interrogation request to identify the most popular Asset Class (e.g., Foreign Exchange), and within the Foreign Exchange asset class, further identify that the most popular Item Type is Spot, and within the item type, further identify that the most popular Item is CAD.

At 450, user module 136 registers the interrogation request received from the remote terminal 190 and analyzes the request at 460 by retrieving data from history module 146 and data sources 110, if appropriate. At 470, user module 470 formats the interrogation result for display at the remote terminal 190, for example at 480.

Figure 5:
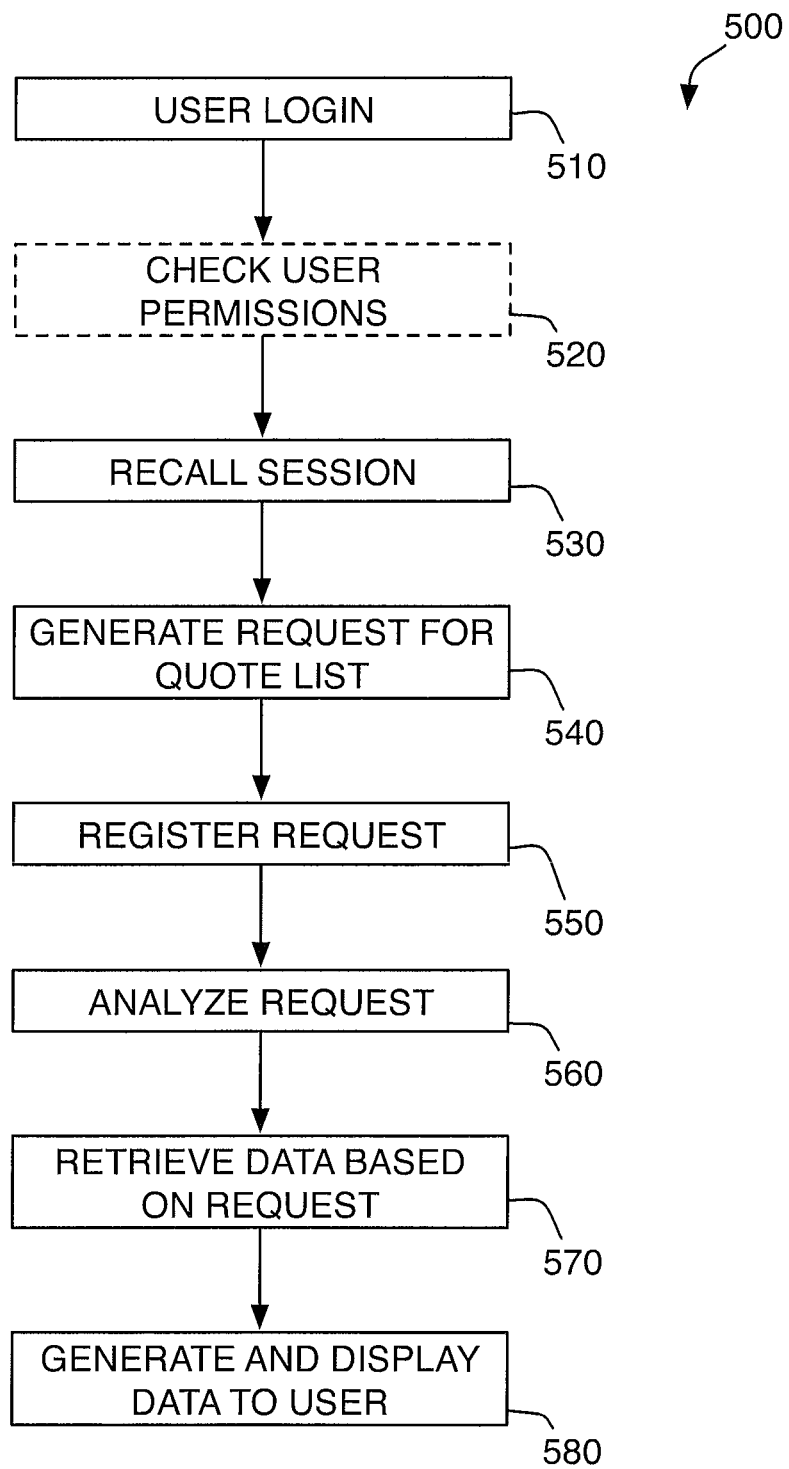
FIG. 5 is an example process flow diagram for a quote list request.

Referring now to FIG. 5, there is shown a process flow diagram for an example quote list request 500. A quote list request can be used as a specific type of interrogation request, wherein a user identifies one or more particular items for which to receive specific data. For example, a user may have a list of stock exchange symbols for which the current prices are desired.

In general, the steps of quote list request 500 correspond to interrogation request 400, except that request 540 may be generated using a custom user interface.

Figure 6:
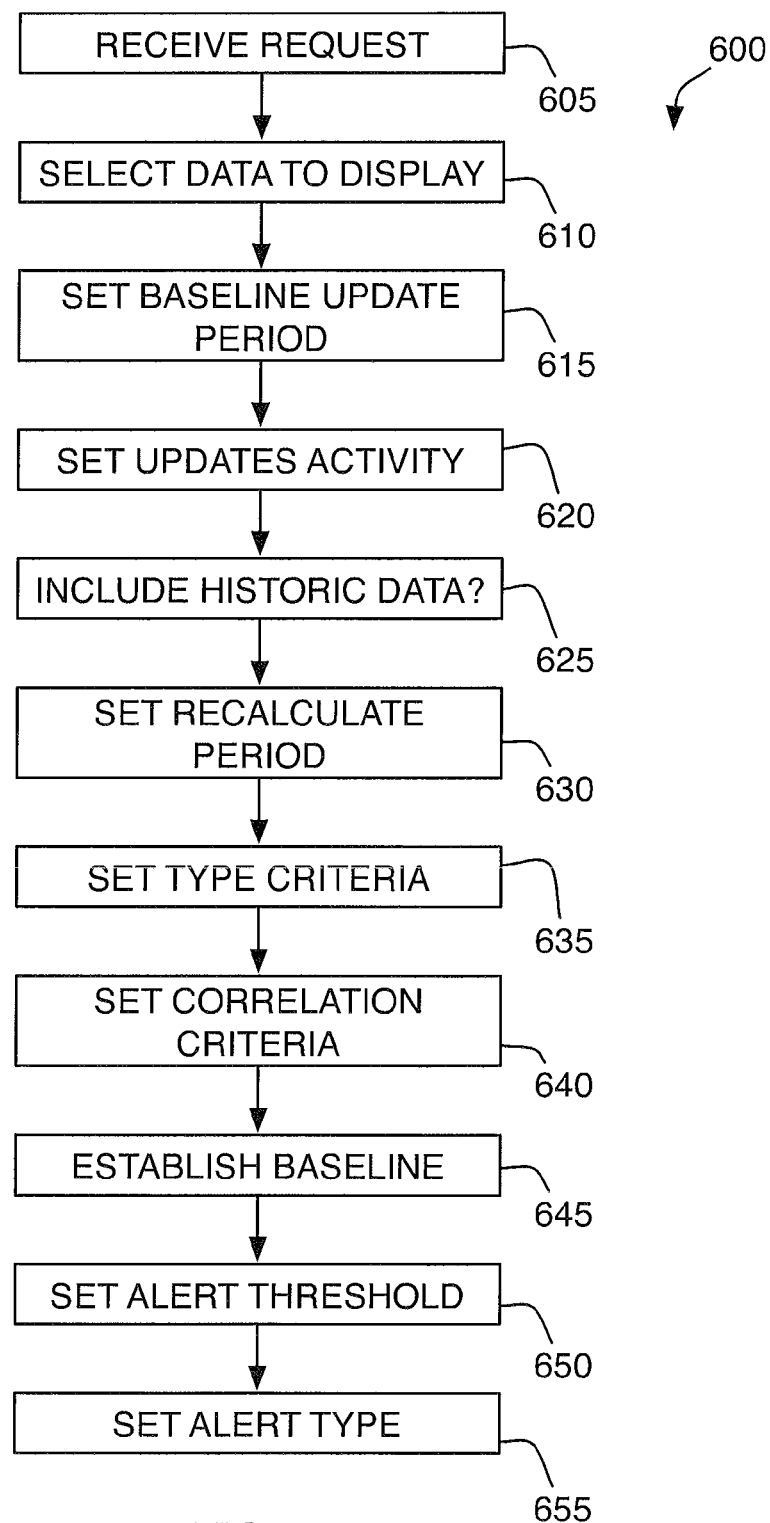
FIG. 6 is an example process flow diagram for an alert configuration process.

Referring now to FIG. 6, there is shown an example process flow diagram for configuring an alert. Alerts may be generated when demand for a particular data item of interest deviates from an established activity threshold level. Accordingly, alerts can be configured to notify users when there is a change in the popularity or viewership (e.g., based on viewership indicators) of particular data by other users. As alert generation system 150 can monitor user sessions and each discrete data element displayed in each user session, system 150 can "flag" discrete data elements such as items, pages and other displays containing data that are actively being displayed to users of remote terminals. Accordingly, users can establish alerts to inform them when, for example, "bonds" become more popular than "foreign exchange". Further information can be obtained by correlating data such as economic statistics published within a specific historic interval.

The baseline or activity threshold level can be a moving average level, or absolute level, of viewership or interest in a particular asset class, asset type, marketplace, and the like.

The activity threshold level may be used to establish a reference level from which to measure or determine increases or decreases (a "demand delta") in popularity of a particular data element (based on a viewership indicator). Activity threshold levels may be calculated at any moment, in real-time, at pre-selected times, or at predetermined intervals (e.g., daily, hourly, etc.), based on a selected activity threshold level or baseline update period, or according to some combination thereof.

Demand Deltas can configured for a change in the number of requests to view an item, page, news headline or story, composite display, text or other data relevant to an asset class, asset, source, marketplace, etc. Demand deltas may be determined at any moment, in real-time, at pre-selected times, or at predetermined intervals. In particular, demand deltas may be identified through the use of an alert.

Alert configuration process 600 can begin with an alert request at 605. Alert requests may be generated by users of a remote terminal 190 or by administrators.

At 610, configuration can begin by selecting whether to include or exclude data that is already displayed in a window of the current session (e.g., "permanently viewed" data) from data canvassed during the alerting process. Alternatively, all data may be selected.

At 615, the baseline update period may be selected (e.g., real-time, daily, hourly, etc.). The baseline update period can determine how frequently alert generation system 150 recalculates its baselines for an alert.

At 620, the data update period may be selected (e.g., real-time, daily, hourly, etc.). The data update period can determine how frequently alert generation system 150 retrieves and refreshes data from data sources 110. In some cases, data updates may be configured to occur at the same time as baseline updates. In other cases, data updates may occur independently of baseline updates.

At 625, historical data may be included or excluded from the data canvassed during the alerting process.

At 630, an alert update period may be selected (e.g., real-time, daily, hourly, etc.), for re-evaluating existing alerts and generating alerts as needed. In some cases, alert updates may be configured to occur at the same time as baseline or data updates. In other cases, alert updates may occur independently of baseline or data updates.

At 635, type criteria, such as asset class, item type, item, region, participant type and publisher type, may be selected in similar fashion as when configuring an interrogation request.

At 640, correlation criteria may be configured for use in generating an alert, in similar fashion as when configuring an interrogation request.

At 645, one or more baselines or activity threshold levels for the alert may be determined. The activity threshold level may be a simple average of users actively viewing a data item for a specified period, or it may be a point-in-time snapshot of users actively viewing the data item. Other methods of determining the activity threshold level may be used.

For example, consider an alert for item X. Baseline updates are scheduled to occur every hour. Alert updates are scheduled every 30 minutes. The baseline, in this example, is configured to be a point-in-time snapshot.

If 100 users are viewing X at time t=0, the baseline for that time period is 100. If, at time t=15 mins, 10 more users begin viewing the same item, and assuming no other users begin viewing or cease viewing the same item before time t=30 mins, then the demand delta at the alert update time of t=30 mins will be +10 or +10%.

At time t=1 hour, assuming no other users have viewed or ceased viewing in the intervening period, the baseline update will determine a new baseline or activity threshold level of 110. Subsequently, demand deltas will be compared against the new baseline of 110.

A similar approach can be followed for asset classes, asset types, marketplaces, etc.

In many cases, users of an alert generation system, such as alert generation system 150, may be located in many different geographic locations. As such, their working hours may differ, such that demand deltas may occur throughout the day as the working day ends in one region (e.g., Europe) and begins in another (e.g., New York). As users log off from their terminals in one area or log on to their terminals in another area, there may be changes in viewership indicators that result in apparent demand deltas for a large number of discrete data elements, including many commonly accessed data elements. Such demand deltas may not be considered relevant by all users, since they may not reflect increased attention or interest.

Conversely, an above average level of interest in a region outside of ordinary business hours may be indicative of positive or negative market sentiment, for example if there is a scheduled market event, such as the release of economic statistics.

Recurring demand deltas such as those associated with working day differences can be filtered by determining demand delta histories or patterns. Accordingly, atypical demand deltas can be more readily identified.

For example, each user's login or logout habits can be maintained in a historical database and aggregated based on geographic region. An additional correlated historical database may be employed to match data publication times with historical market activity in other assets, classes, marketplaces, etc.

Historical demand deltas can be queries or requests that are configured to identify data correlated in time and, for example, correlated to a previous event. The previous event may be, for example, a previous delta event for a specific data item. Accordingly, the historical demand delta may be configured to display some other discrete data element of interest correlated to that previous event. For example, if the selected previous event is a previous demand delta alert, where the demand delta represented an increase of 10% in some data item, the historical demand delta may be configured to display central bank statistics published within an hour of the previous delta event.

In some cases, historical or user profile data may be queried or requested by other users. For example, a request may be made for activity threshold level or other changes, historically or in real-time, of viewership changes according to user profile entitlements.

In one example, a request may be made to identify changes in viewership by users with access to a specific source (e.g., 10% increase in viewership of XYZ by users with access to real-time NYSE).

In some cases, requests can also be made to identify changes, historically or in real-time, of actual user entitlements. For example, a request may be made to identify a 10% increase in entitlements to access real-time NYSE.

In some cases, requests may also be made to identify if a number of active users in a region exceeds a threshold level.

All of the above requests are examples of requests that may reveal if market participants are anticipating activity due to an external event.

At 650, an alert threshold can be configured, which may specify an absolute number or percentage of demand delta at which to generate an alert. For example, the alert threshold may be a 10% increase in viewership. In another example, the alert threshold may be a decrease in viewership of 200 users.

At 655, an alert type can be configured. Alerts may be audible or visual, and may comprise charts, tickers, pop-up windows, text messages (e.g., e-mail), short messages (e.g., SMS), page publication or other alerting means.

Figure 7:
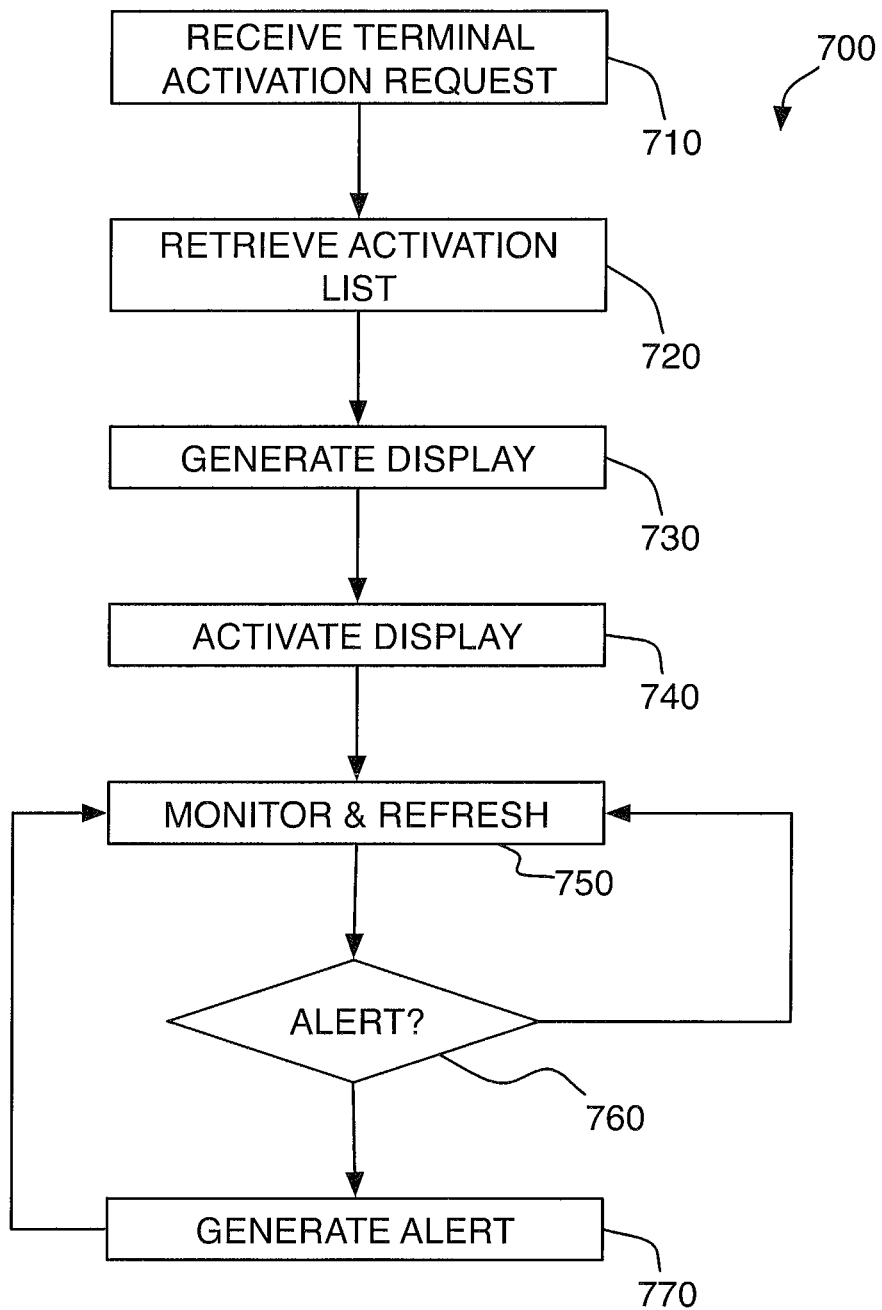
FIG. 7 is an example process flow diagram for a demand monitoring process.

Referring now to FIG. 7, there is shown an example process flow diagram for a demand monitoring process 700. Demand monitoring process 700 may be performed by alert generation system 150 and alerts generation module 131.

At 710, a terminal activation request can be received from a remote terminal, such as remote terminal 190. In practice, remote terminals can send a terminal activation request when a user logs on to alert generation system 150 or any associated system. Accordingly, there may be a plurality of demand monitoring processes 700 concurrently in operation on alert generation system 150. Each terminal activation request may identify a particular user and alert generation system 150 or alerts generation module 131 may verify the user's credentials with, for example, user module 136.

At 720, an activation list, such as a window list, a subscription list, an alert list, or any combination thereof, may be received or retrieved. Activation lists, such as window, subscription and alert lists, may be transmitted by the remote terminal or may be retrieved from, for example, user module 136. Each list may identify one or more discrete data elements to be monitored at remote terminal 190 or alert conditions to be met for generating an alert.

At 730, a display interface may be generated comprising the windows identified in the received window lists. In some cases, remote terminal 190 may be adapted to allow users to deemphasize certain windows, such that their respective discrete data elements are not immediately visible at the remote terminal. In such cases, alert generation system 150 or alerts generation module 131 may be configured to mark the deemphasized data elements as "inactive" or in an intermediate state between active and inactive.

At 740, alert generation system 150 may update viewership indicators in its databases to indicate that the discrete data elements requested in the activation lists are currently active on an additional remote terminal. Likewise, alert generation system 150 may update viewership indicators in its databases to identify requested data elements that are in an inactive or intermediate state. In addition, alert generation system 150 may register the requested activation list and alert lists.

At 750, the requested window lists and subscription lists are displayed at the requesting remote terminal. Alert generation system 150 or alerts generation module 131 may monitor for alert situations, based on the received subscription lists and alert lists at 160. If an alert condition is met, depending on the respective baseline and threshold, an alert may be generated and transmitted at 770.

Figure 8:
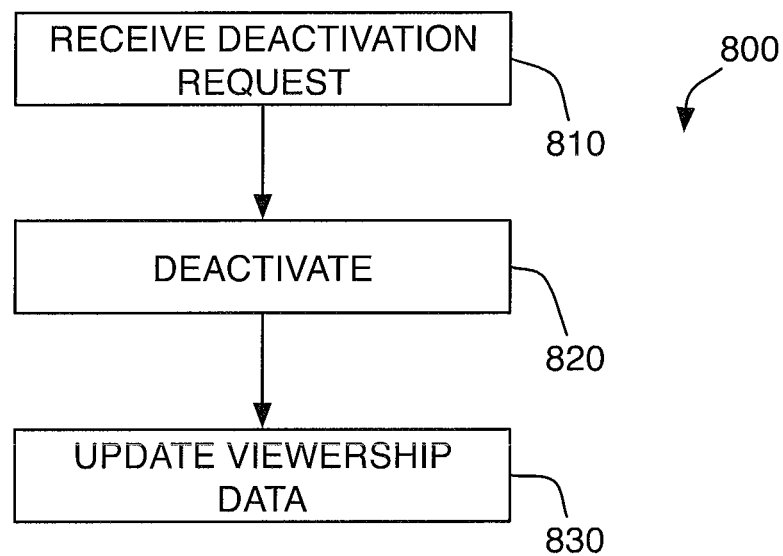
FIG. 8 is an example process flow diagram for a deactivation process.

Referring now to FIG. 8, there is shown an example process flow diagram of a deactivation process 800. Deactivation process 800 may occur when a remote terminal disconnects from alert generation system 150.

At 810, a deactivation request can be received. Accordingly, at 820, alert generation system 150 may terminate its data display at the respective remote terminal 190 and, at 830, alert generation system 150 may update viewership indicators in its databases to indicate that the discrete data elements requested in the window lists are now inactive at the remote terminal, thus indicating a reduction in the viewership of those data elements.

There is disclosed herein a method of generating an alert message, comprising: receiving a plurality of discrete data elements, the plurality of discrete data elements grouped into a plurality of data feeds; parsing the plurality of data feeds to identify each of the plurality of discrete data elements; assigning a plurality of identifiers, each of the plurality of identifiers assigned to one of the plurality of discrete data elements; receiving a plurality of activation lists for a plurality of remote terminals, each activation list comprising a subset of the plurality of identifiers; for each activation list, generating and activating a display interface at the corresponding remote terminal, the display interface comprising a subset of the plurality of discrete data elements corresponding to the subset of the plurality of identifiers in the activation list; updating a plurality of viewership indicators corresponding to each of the plurality of discrete data elements, each update based on a total number of the plurality of activation lists in which each of the plurality of discrete data elements appears; and generating the alert message when at least one of the plurality of viewership indicators exceeds an activity threshold level.

In addition, there is further disclosed wherein the activity threshold level is a specific threshold level corresponding to one of the plurality of viewership indicators, further comprising generating the specific threshold level based on the one of the plurality of viewership indicators.

In addition, there is further disclosed wherein the activity threshold level is a composite threshold level corresponding to a subset of the plurality of viewership indicators, further comprising generating the specific threshold level based on the subset of the plurality of viewership indicators.

In addition, there is further disclosed receiving a plurality of deactivation requests, each deactivation request comprising a second subset of the plurality of identifiers; for each deactivation request, deactivating the display interface at the corresponding remote terminal; and updating the plurality of viewership indicators corresponding to each of the plurality of discrete data elements, each update based on a second total number of the plurality of deactivation requests in which each of the plurality of discrete data elements appears.

In addition, there is further disclosed wherein at least one activation request comprises a group identifier for identifying a second subset of the plurality of identifiers according to an associated criterion.

In addition, there is further disclosed wherein the associated criterion is a type associated with the discrete data element.

In addition, there is further disclosed wherein the associated criterion is a geographical region associated with the discrete data element.

In addition, there is further disclosed wherein each of the plurality of activation requests corresponds to one of the plurality of remote terminals.

In addition, there is further disclosed wherein each of the plurality of remote terminals is associated with a unique user identifier.

In addition, there is further disclosed wherein the plurality of discrete data elements are received from a plurality of external sources.

There is also disclosed herein a system for generating an alert message, the system comprising: a memory; at least one communication interface; and a processor, the processor configured to: receive a plurality of discrete data elements, the plurality of discrete data elements grouped into a plurality of data feeds; parse the plurality of data feeds to identify each of the plurality of discrete data elements; assign a plurality of identifiers, each of the plurality of identifiers assigned to one of the plurality of discrete data elements; receive a plurality of activation lists for a plurality of remote terminals, each activation list comprising a subset of the plurality of identifiers; for each activation list, generate and activate a display interface at the corresponding remote terminal, the display interface comprising a subset of the plurality of discrete data elements corresponding to the subset of the plurality of identifiers in the activation list; update a plurality of viewership indicators corresponding to each of the plurality of discrete data elements, each update based on a total number of the plurality of activation lists in which each of the plurality of discrete data elements appears; and generate an alert message when at least one of the plurality of viewership indicators exceeds an activity threshold level.

In addition, there is further disclosed wherein the activity threshold level is a specific threshold level corresponding to one of the plurality of viewership indicators, and wherein the process is further configured to generate the specific threshold level based on the one of the plurality of viewership indicators.

In addition, there is further disclosed wherein the activity threshold level is a composite threshold level corresponding to a subset of the plurality of viewership indicators, and wherein the process is further configured to generate the specific threshold level based on the subset of the plurality of viewership indicators.

In addition, there is further disclosed wherein the processor is further configured to: receive a plurality of deactivation requests, each deactivation request comprising a second subset of the plurality of identifiers; for each deactivation request, deactivate the display interface at the corresponding remote terminal; and update the plurality of viewership indicators corresponding to each of the plurality of discrete data elements, each update based on a second total number of the plurality of deactivation requests in which each of the plurality of discrete data elements appears.

In addition, there is further disclosed wherein at least one activation request comprises a group identifier for identifying a second subset of the plurality of identifiers according to an associated criterion.

In addition, there is further disclosed wherein the associated criterion is a type associated with the discrete data element.

In addition, there is further disclosed wherein the associated criterion is a geographical region associated with the discrete data element.

In addition, there is further disclosed wherein each of the plurality of activation requests corresponds to one of the plurality of remote terminals.

In addition, there is further disclosed wherein the plurality of discrete data elements are received from a plurality of external sources.

There is also disclosed herein a non-transitory computer readable medium storing instructions executable by a processor, the instructions for causing the processor to: receive a plurality of discrete data elements, the plurality of discrete data elements grouped into a plurality of data feeds; parse the plurality of data feeds to identify each of the plurality of discrete data elements; assign a plurality of identifiers, each of the plurality of identifiers assigned to one of the plurality of discrete data elements; receive a plurality of activation lists for a plurality of remote terminals, each activation list comprising a subset of the plurality of identifiers; for each activation list, generate and activate a display interface at the corresponding remote terminal, the display interface comprising a subset of the plurality of discrete data elements corresponding to the subset of the plurality of identifiers in the activation list; update a plurality of viewership indicators corresponding to each of the plurality of discrete data elements, each update based on a total number of the plurality of activation lists in which each of the plurality of discrete data elements appears; and generate an alert message when at least one of the plurality of viewership indicators exceeds an activity threshold level.

It will be appreciated that various embodiments may comprise one or more special purpose or general purpose computers or servers, each of which may include, but are not limited to, one or more processors, memories, storage devices, input/output devices and network interfaces. Likewise, the terms 'computer' and 'server' may be interchangeable in accordance with the above description. Although embodiments have been described as separate components, it will be understood that various components could be combined into a single computer or server, or implemented across multiple computers or servers all connected via a communications medium such as the Internet. Likewise, it will be understood that functionality described herein as being provided by a specific component or module may also be provided by another component or module without departing from the scope of these embodiments.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Various modifications and variations may be made to these exemplary embodiments without departing from the spirit and scope of the invention, which is limited only by the appended claims.

We claim:

1. A method of generating user-specific data alerts for users in a distributed system, the method comprising:
   providing an information viewer application for installation on a plurality of remote terminals in communication with a central computer server, the information viewer application having a display interface that is remotely configured by the central computer server;
   receiving a plurality of data feeds at the central computer server sent from a plurality of data sources over a network, each of the plurality of data feeds comprising a plurality of discrete data elements, the central computer server comprising a microprocessor that
   parses the plurality of data feeds to identify each of the plurality of discrete data elements;
   assigns a plurality of identifiers to the identified plurality of discrete data elements, each of the plurality of identifiers assigned to one of the plurality of discrete data elements;
   receives a plurality of activation requests from the plurality of remote terminals via the information viewer application, each activation request corresponding to a user associated with one of the remote terminals;
   identifies an activation list in response to each activation request, each activation list corresponding to the remote terminal in the plurality of remote terminals from which the corresponding activation request was received, and each activation list comprising a subset of the plurality of identifiers that identifies a subset of the discrete data elements requested by the corresponding remote terminal;
   for each activation request, transmits the subset of the plurality of discrete data elements corresponding to the subset of the plurality of identifiers in the corresponding activation list to the corresponding remote terminal to cause the information viewer application to activate the display interface to display at least some of the subset of the plurality of discrete data elements on the remote terminal;
   receives a plurality of alert requests, each alert request corresponding to one of the remote terminals and each alert request including user-defined alert settings for the corresponding remote terminal defined by the user associated with the remote terminal, the user-defined alert settings including user-specific activity threshold levels;
   concurrently monitors, through the information viewer application, each activated display interface to track the discrete data elements currently displayed using the information viewer application at each of the plurality of remote terminals;
   updates a plurality of viewership indicators corresponding to each of the plurality of discrete data elements, each update based on a total number of the activated display interfaces in which each of the plurality of discrete data elements is currently displayed;
   generates an alert message when at least one of the plurality of viewership indicators exceeds an activity threshold level defined in at least one of the alert requests, the alert message corresponding to at least one particular discrete data element whose corresponding viewership indicators exceeded a particular user-specific activity threshold level in the at least one of the alert requests;
   determines at least one particular remote terminal corresponding to the alert message, the at least one particular remote terminal including the remote terminals who user-defined alert settings include the at least one particular discrete data element and the particular user-specific activity threshold; and
   transmits the alert message to the at least one particular remote terminal to cause the information viewer application on each of the at least one particular remote terminals to display the alert message.

2. The method of claim 1, wherein the activity threshold level is a specific threshold level corresponding to one of the plurality of viewership indicators, further comprising generating the specific threshold level based on the one of the plurality of viewership indicators.

3. The method of claim 1, wherein the activity threshold level is a composite threshold level corresponding to a subset of the plurality of viewership indicators, further comprising generating the composite threshold level based on the subset of the plurality of viewership indicators.

4. The method of claim 1, further comprising:
   receiving a plurality of deactivation requests, each deactivation request comprising a second subset of the plurality of identifiers;
   for each deactivation request, deactivating the display interface at the corresponding remote terminal; and
   updating the plurality of viewership indicators corresponding to each of the plurality of discrete data elements, each update based on a second total number of the activated display interfaces in which each of the plurality of discrete data elements is currently visible.

5. The method of claim 1, wherein at least one activation list comprises a group identifier for identifying a second subset of the plurality of identifiers according to an associated criterion.

6. The method of claim 5, wherein the associated criterion is a type associated with the discrete data element.

7. The method of claim 5, wherein the associated criterion is a geographical region associated with the discrete data element.

8. The method of claim 1, wherein each of the plurality of remote terminals is associated with a unique user identifier.

9. The method of claim 1, wherein the plurality of discrete data elements is received from a plurality of external sources.

10. The method of claim 1, wherein:
the information viewer application for a particular remote terminal modifies the at least some of the subset of the plurality of discrete data elements currently displayed in the display interface in response to input received at that remote terminal; and
the microprocessor determines that the total number of the activated display interfaces in which at least one of the discrete data elements is currently displayed has changed and updates the plurality of viewership indicators based on a second total number of activated display interfaces in which each of the plurality of discrete data elements is currently displayed.

11. A system for generating user-specific data alerts for distributed users, the system comprising:
a plurality of remote terminals for a plurality of users; and
a computer server connected to the plurality of remote terminals over a network;
wherein each remote terminal has an information viewer application installed, the information viewer application having a display interface that is remotely configured by the computer server;
and wherein the computer server comprises a processor that is programmed to
receive from a plurality of data sources over a network a plurality of data feeds, each of the plurality of data feeds comprising a plurality of discrete data elements;
parse the plurality of data feeds to identify each of the plurality of discrete data elements;
assign a plurality of identifiers to the identified plurality of discrete data elements, each of the plurality of identifiers assigned to one of the plurality of discrete data elements;
receive a plurality of activation requests from the plurality of remote terminals via the information viewer application, each activation request corresponding to a user associated with one of the remote terminals;
identify an activation list in response to each activation request, each activation list corresponding to the remote terminal in the plurality of remote terminals from which the corresponding activation request was received, and each activation list comprising a subset of the plurality of identifiers that identifies a subset of the discrete data elements requested by the corresponding remote terminal;
for each activation request, transmit the subset of the plurality of discrete data elements corresponding to the subset of the plurality of identifiers in the corresponding activation list over the network to the remote terminal to cause the information viewer application to activate the display interface to display at least some of the subset of the plurality of discrete data elements on the remote terminal;
receive a plurality of alert requests, each alert request corresponding to one of the remote terminals and each alert request including user-defined alert settings for the corresponding remote terminal defined by the user associated with the remote terminal, the user-defined alert settings including user-specific activity threshold levels;
concurrently monitor, through the information viewer application, each activated display interface to track the discrete data elements currently displayed using the information viewer application at each of the plurality of remote terminals;
update a plurality of viewership indicators corresponding to each of the plurality of discrete data elements, each update based on a total number of the activated display interfaces in which each of the plurality of discrete data elements is currently displayed;
generate an alert message when at least one of the plurality of viewership indicators exceeds an activity threshold level defined in at least one of the alert requests, the alert message corresponding to at least one particular discrete data element whose corresponding viewership indicators exceeded a particular user-specific activity threshold level in the at least one of the alert requests;
determine at least one particular remote terminal corresponding to the alert message, the at least one particular remote terminal including the remote terminals who user-defined alert settings include the at least one particular discrete data element and the particular user-specific activity threshold; and
transmit the alert message to the at least one particular remote terminal to cause the information viewer application on each of the at least one particular remote terminals to display the alert message.

12. The system of claim 11, wherein the activity threshold level is a specific threshold level corresponding to one of the plurality of viewership indicators, and wherein the processor is further configured to generate the specific threshold level based on the one of the plurality of viewership indicators.

13. The system of claim 11, wherein the activity threshold level is a composite threshold level corresponding to a subset of the plurality of viewership indicators, and wherein the processor is further configured to generate the composite threshold level based on the subset of the plurality of viewership indicators.

14. The system of claim 11, wherein the processor is further configured to:
receive a plurality of deactivation requests, each deactivation request comprising a second subset of the plurality of identifiers;
for each deactivation request, deactivate the display interface at the corresponding remote terminal; and
update the plurality of viewership indicators corresponding to each of the plurality of discrete data elements, each update based on a second total number of the activated display interfaces in which each of the plurality of discrete data elements appears.

15. The system of claim 11, wherein at least one activation list comprises a group identifier for identifying a second subset of the plurality of identifiers according to an associated criterion.

16. The system of claim 15, wherein the associated criterion is a type associated with the discrete data element.

17. The system of claim 15, wherein the associated criterion is a geographical region associated with the discrete data element.

18. The system of claim 11, wherein the plurality of discrete data elements is received from a plurality of external sources.

19. The system of claim 11, wherein
the information viewer application is configured to modify the at least some of the subset of the plurality of discrete data elements currently displayed in the display interface in response to input received at a particular remote terminal; and
the processor is programmed to determine that the total number of the activated display interfaces in which at least one of the discrete data elements is currently displayed has changed and update the plurality of viewership indicators based on a second total number of activated display interfaces in which each of the plurality of discrete data elements is currently displayed.

20. A non-transitory computer readable medium storing instructions executable by a processor, the instructions for causing the processor to:
receive a plurality of data feeds sent from a plurality of data sources over a network, each of the plurality data feeds comprising a plurality of discrete data elements;
parse the plurality of data feeds to identify each of the plurality of discrete data elements;
assign a plurality of identifiers to the identified plurality of discrete data elements, each of the plurality of identifiers assigned to one of the plurality of discrete data elements;
receive a plurality of activation requests from a plurality of remote terminals via an information viewer application installed on each remote terminal, the information viewer application having a display interface that is remotely configured by the processor and each activation request corresponding to a user associated with one of the remote terminals;
identify an activation list in response to each activation request, each activation list corresponding to the remote terminal from which the corresponding activation request was received, and each activation list comprising a subset of the plurality of identifiers that identifies a subset of the discrete data elements requested by the corresponding remote terminal;
for each activation request, transmit the subset of the plurality of discrete data elements corresponding to the subset of the plurality of identifiers in the corresponding activation list to the corresponding remote terminal to cause the information viewer application to activate the display interface to displays at least some of the subset of the plurality of discrete data elements on the remote terminal;
receive a plurality of alert requests, each alert request corresponding to one of the remote terminals and each alert request including user-defined alert settings for the corresponding remote terminal defined by the user associated with the remote terminal, the user-defined alert settings including user-specific activity threshold levels;
concurrently monitor, through the information viewer application, each activated display interface to track the discrete data elements currently displayed using the information viewer application at each of the plurality of remote terminals;
update a plurality of viewership indicators corresponding to each of the plurality of discrete data elements, each update based on a total number of the activated display interfaces in which each of the plurality of discrete data elements is currently displayed;
generate an alert message when at least one of the plurality of viewership indicators exceeds an activity threshold level defined in at least one of the alert requests, the alert message corresponding to at least one particular discrete data element whose corresponding viewership indicators exceeded a particular user-specific activity threshold level in the at least one of the alert requests;
determine at least one particular remote terminal corresponding to the alert message, the at least one particular remote terminal including the remote terminals who user-defined alert settings include the at least one particular discrete data element and the particular user-specific activity threshold; and
transmit the alert message to the at least one particular remote terminal to cause the information viewer application on each of the at least one particular remote terminals to display the alert message.

* * * * *